(12) United States Patent
Cao et al.

(10) Patent No.: US 9,693,172 B2
(45) Date of Patent: Jun. 27, 2017

(54) SYSTEM AND METHOD FOR MACHINE-TYPE COMMUNICATIONS

(71) Applicant: Huawei Technologies Co., Ltd., Shenzhen (CN)

(72) Inventors: Yu Cao, Kanata Ottawa (CA); Ming Jia, Ottawa (CA); Jianglei Ma, Ottawa (CA); Javad Abdoli, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/228,187

(22) Filed: Mar. 27, 2014

(65) Prior Publication Data

US 2015/0282008 A1 Oct. 1, 2015

(51) Int. Cl.
| | | |
|---|---|---|
| H04B 7/00 | (2006.01) | |
| H04W 4/00 | (2009.01) | |
| H04W 28/02 | (2009.01) | |
| H04J 14/02 | (2006.01) | |
| H04W 72/04 | (2009.01) | |

(52) U.S. Cl.
CPC ............. *H04W 4/005* (2013.01); *H04J 14/02* (2013.01); *H04W 28/02* (2013.01); *H04W 28/0284* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 2012/0127934 A1* | 5/2012 | Anderson | ......... H04W 72/0406 370/329 |
| 2012/0155310 A1 | 6/2012 | Kreuzer et al. | |
| 2012/0287885 A1 | 11/2012 | Dai | |
| 2013/0114436 A1* | 5/2013 | Dural | .................... H04W 24/10 370/252 |
| 2013/0343255 A1 | 12/2013 | Han et al. | |
| 2014/0153500 A1* | 6/2014 | Duan | .................. H04W 52/265 370/329 |

FOREIGN PATENT DOCUMENTS

| | | |
|---|---|---|
| AU | 686744 | 9/1995 |
| CN | 102137473 A | 7/2011 |
| CN | 102769891 A | 11/2012 |
| EP | 2680656 A1 | 1/2014 |
| WO | 2013164025 A1 | 11/2013 |

OTHER PUBLICATIONS

Fettweis, G., et al., "GFDM—Generalized Frequency Division Multiplexing," Vehicular Technology Conference, VTC Spring 2009 IEEE 69th, Apr. 26-29, 2009, pp. 1-4.
International Search Report and Written Opinion received in Application No. PCT/CN2015/074025 mailed Jun. 11, 2015, 10 pages.

* cited by examiner

*Primary Examiner* — Minh-Trang Nguyen
(74) *Attorney, Agent, or Firm* — Slater Matsil, LLP (57) ABSTRACT

A method for operating a machine-type device (MTD) includes determining communications requirements for a machine-type device (MTD), and assigning a first signal waveform selected from a plurality of signal waveforms to the MTD in accordance with the determined communications requirements, wherein each signal waveform has an associated characteristic signal bandwidth.

31 Claims, 10 Drawing Sheets

SYSTEM AND METHOD FOR MACHINE-TYPE COMMUNICATIONS

TECHNICAL FIELD

The present disclosure relates generally to digital communications, and more particularly to a system and method for machine-type communications (MTC).

BACKGROUND

In general, machine-to-machine (M2M) communications refer to connectivity between a large number of machine-type devices that communicate with each other or with a connected service without need for human intervention. In M2M communications, also commonly referred to as machine-type communications (MTC), machines (devices) can directly communicate with one another or can make use of a common network, such as the Internet.

The M2M market is quickly growing and some forecasts estimate that billions of machine-type devices will be deployed in the coming decade. Applications for these machine-type devices include smart metering, smart grid, surveillance, security, vehicle-to-vehicle communications, intelligent transportation system (ITS), e-health, industrial Internet, cloud computing, and the like.

Some of the challenges for MTC include:
1) Massive Connections. The number of connected MTC devices is growing. It is expected the number of deployed MTC devices will increase by at least an order of magnitude within a decade. Many of these devices will rely upon a connection to a wireless network which may overwhelm current Long Term Evolution (LTE) based wireless networks;
2) High coverage for supporting remote sensors. It has been estimated that the link budget of a network supporting a large number of MTC devices will need to be 15 dB to 20 dB above GSM 900/UMTS 900/LTE 800;
3) Cost of hardware. Due to large number of meters and sensors, the cost per device needs to be low to enable successful commercial deployment. It is expected that the per device cost will need to be in the range of one to two dollars to achieve wide scale commercial use;
4) Power Consumption. Many meters and sensors are expected to be powered by batteries and some may have only intermittent access to other power sources. Due to the cost constraints and power limitations, it is expected that MTC devices may require a standby time in the target of several years for a single battery; and
5) Asynchronous transmission mode. Currently deployed wireless networks typically rely upon device synchronizing with a base station to synchronize transmissions to defined time windows. This can be burdensome to implement in a low cost device with limited power supply. A reduction in signaling overhead caused by the need for synchronous transmissions would also be desirable.

Therefore, there is a need for a system and a method for supporting MTC with large numbers of machine-type devices while meeting the challenges described above.

SUMMARY OF THE DISCLOSURE

Example embodiments of the present disclosure which provide a system and method for machine-type communications (MTC).

In accordance with an example embodiment of the present disclosure, a method for operating a communications controller is provided. The method includes determining, by the communications controller, communications requirements for a machine-type device (MTD), and assigning, by the communications controller, a first signal waveform selected from a plurality of signal waveforms to the MTD in accordance with the determined communications requirements, wherein each signal waveform has an associated characteristic signal bandwidth. The method also includes transmitting, by the communications controller, information about the first signal waveform to the MTD.

In accordance with another example embodiment of the present disclosure, a method for operating a machine-type device (MTD) is provided. The method includes receiving, by the MTD, transmission characteristics of a signal waveform from a communications controller, wherein the signal waveform has an associated characteristic signal bandwidth, and wherein the transmission characteristics include at least one of a bandwidth associated with the MTD, and a level of a modulation and coding scheme (MCS) used for transmission, and generating, by the MTD, a packet including data to be transmitted. The method also includes transmitting, by the MTD, the packet to the communications controller in accordance with the transmission characteristics, wherein the packet is transmitted using the signal waveform.

In accordance with an example embodiment of the present disclosure, a communications controller is provided. The communications controller includes a processor, and a transmitter operatively coupled to the processor. The processor determines communications requirements for a machine-type device (MTD), and assigns a first signal waveform out of a plurality of signal waveforms to the MTD in accordance with the communications requirements for the MTD, wherein each signal waveform has an associated characteristic signal bandwidth. The transmitter transmits information about the first signal waveform to the MTD.

In accordance with an example embodiment of the present disclosure, a machine-type device (MTD) is provided. The MTD includes a receiver, a processor operatively coupled to the receiver, and a transmitter operatively coupled to the processor. The receiver receives transmission characteristics of a signal waveform from a communications controller, wherein the signal waveform has an associated characteristic signal bandwidth, and wherein the transmission characteristics include at least one of a bandwidth associated with the MTD, and a level of a modulation and coding scheme (MCS) used for transmission. The processor generates a packet including data to be transmitted. The transmitter transmits the packet to the communications controller in accordance with the transmission characteristics, wherein the packet is transmitted using the signal waveform.

One advantage of an embodiment is that large numbers of machine-type devices are supported while maintaining low hardware costs and low power requirements.

A further advantage of an embodiment is that large coverage areas are supported by allowing communications to occur at low signal power levels.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to machine-type communications (MTC). For example, a communication controller determines communications requirements for a machine-type device (MTD), and assigns a first signal waveform selected from a plurality of signal waveforms to the MTD in accordance with the communications requirements for the MTD, where each signal waveform has an associated characteristic signal bandwidth. The communication controller also transmits information about the first signal waveform to the MTD, and receives a packet from the MTD, wherein the packet is transmitted using the first signal waveform.

The present disclosure will be described with respect to example embodiments in a specific context, namely communications systems that support MTC for machine-type devices. The disclosure may be applied to standards compliant communications systems, such as those that are compliant with Third Generation Partnership Project (3GPP), IEEE 802.11, and the like, technical standards, and non-standards compliant communications systems, that support MTC for machine-type devices.

Figure 1A:
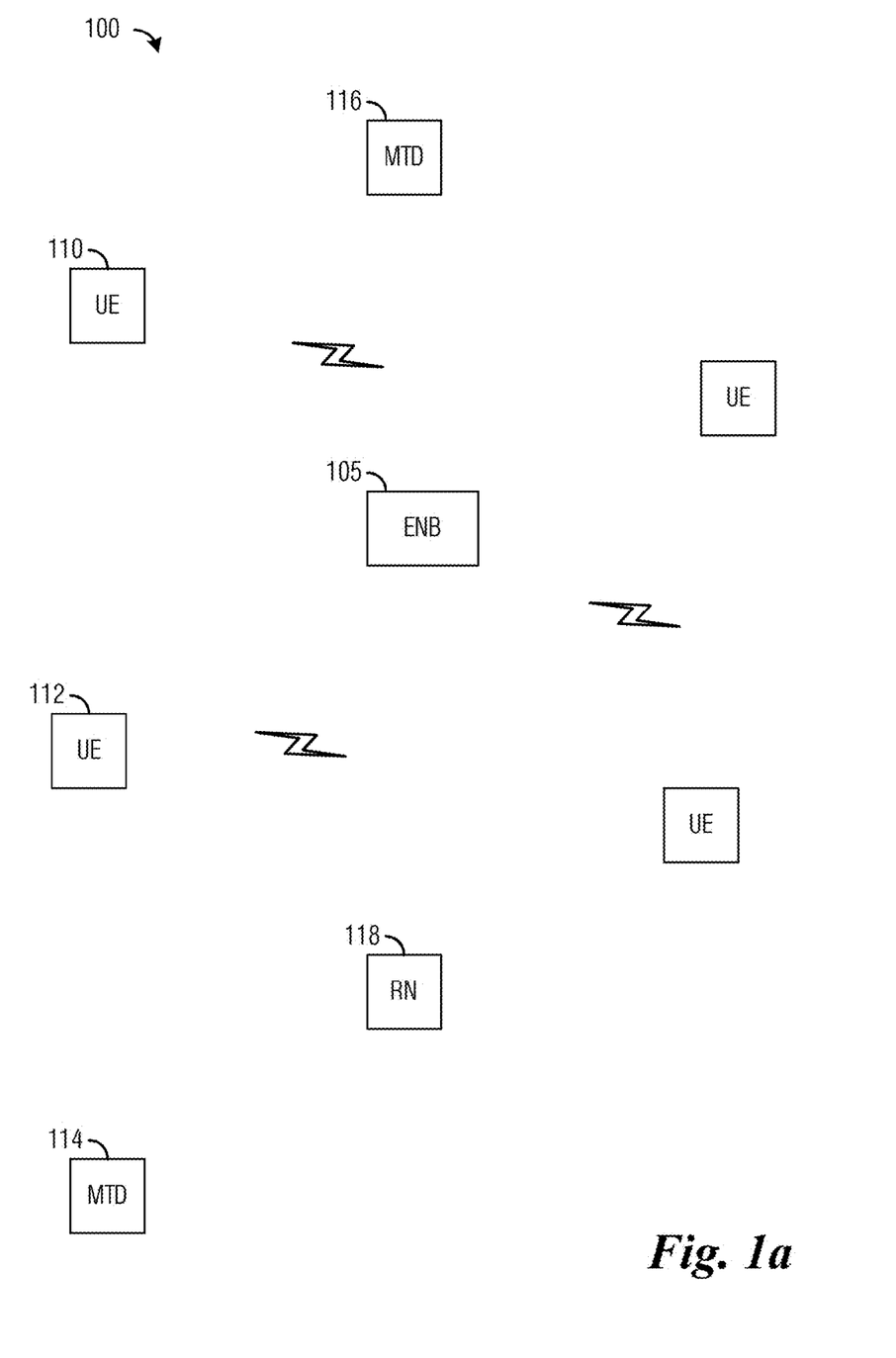
FIG. 1a illustrates a portion of a first example communications system according to example embodiments described herein.

FIG. 1a illustrates a portion of a first example communications system 100. Communications system 100 may include an evolved NodeB (eNB) 105 operating as a communications controller. Communications system 100 may also include user equipment (UE), such as UE 110 and UE 112, as well as machine-type device (MTD), such as MTD 114 and MTD 116. In general, an eNB may also be referred to as a communications controller, a NodeB, a base station, a controller, and the like. Similarly, a UE may also be referred to as a mobile station, a mobile, a terminal, a user, a subscriber, and the like. Communications system 100 may also include a relay node (RN) 118 that is capable of utilizing a portion of resources of eNB 105 to help improve coverage and/or overall performance of communications system 100.

While it is understood that communications systems may employ multiple eNBs capable of communicating with a number of devices, only one eNB, one RN, and a number of UEs and MTDs are illustrated for simplicity.

One common application for MTD and MTC involves the use of MTDs as sensors that occasionally and/or periodically report information to a centralized entity through MTC with an eNB. Examples of such an application may include e-health monitors, smart meters, security system monitors, fire monitors, weather monitors, home automation monitors, vehicle monitors, and the like. In such an application, the MTDs generally have very low data bandwidth requirements since their reports are usually on the order of tens or hundreds of bytes in size and normally occur infrequently. Although individual MTDs have low communications requirements, they are typically deployed in very large numbers. Hence, the overall communications requirements may be large and difficult to handle effectively.

Figure 1B:
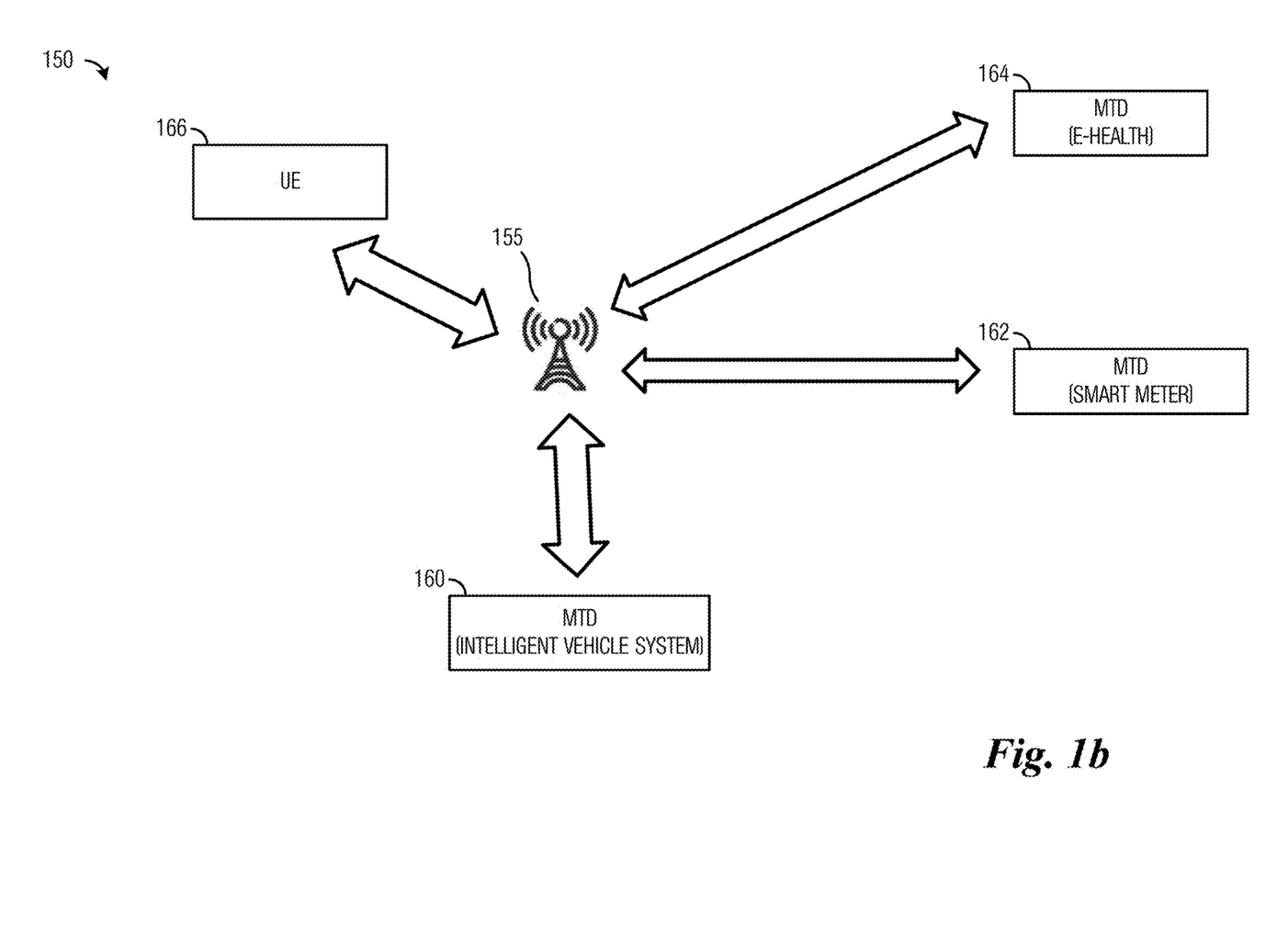
FIG. 1b illustrates a portion of a second example communications system highlight MTDs and MTC according to example embodiments described herein.

FIG. 1b illustrates a portion of a second example communications system 150 highlight MTDs and MTC. Communications system 150 includes an eNB 155 serving both UEs and MTDs. As discussed previously, individual MTDs may have low communications requirements when compared to UEs. However, when there are large numbers of MTDs, their collective communications requirements may be very large and hard to handle in an efficient manner. As shown in FIG. 1b, eNB 155 is serving a MTD 160 that is a part of an intelligent vehicle system, a MTD 162 that is a smart meter, a MTD 164 that is part of an e-health system, and a UE 166. It is noted that communications system 150 may include other UEs and MTDs, but only a limited number are illustrated to simplify discussion.

Depending on applications executing on UE 166, communications between eNB 155 and UE 166 may be interactive and involve large numbers of uplink (communications from UE 166 to eNB 155) and downlink (communications from eNB 155 to UE 166) transmissions. As an illustrative example, if UE 166 is streaming a video and providing constant social media updates, hundreds of megabytes of information may be exchanged between eNB 155 and UE 166 in a small period of time.

However, MTC between eNB 155 and the MTD that it is serving may involve a much smaller amount of data. As an illustrative example, MTD 162 may transmit power usage information to eNB 155 (which will forward the information to a server associated with MTD 162) once every few seconds, few tens of seconds, or few minutes. Furthermore, the power usage information may only a few bytes in size. Similarly, MTD 164 may transmit health information to eNB 155 only if it detects an anomaly in the health information of a patient it is monitoring. Therefore, most of the time, MTD 164 may not even have to transmit any information.

However, there may be a large number of MTD, hence, the resultant MTC requirements may be large and hard to handle efficiently.

Figure 1C:
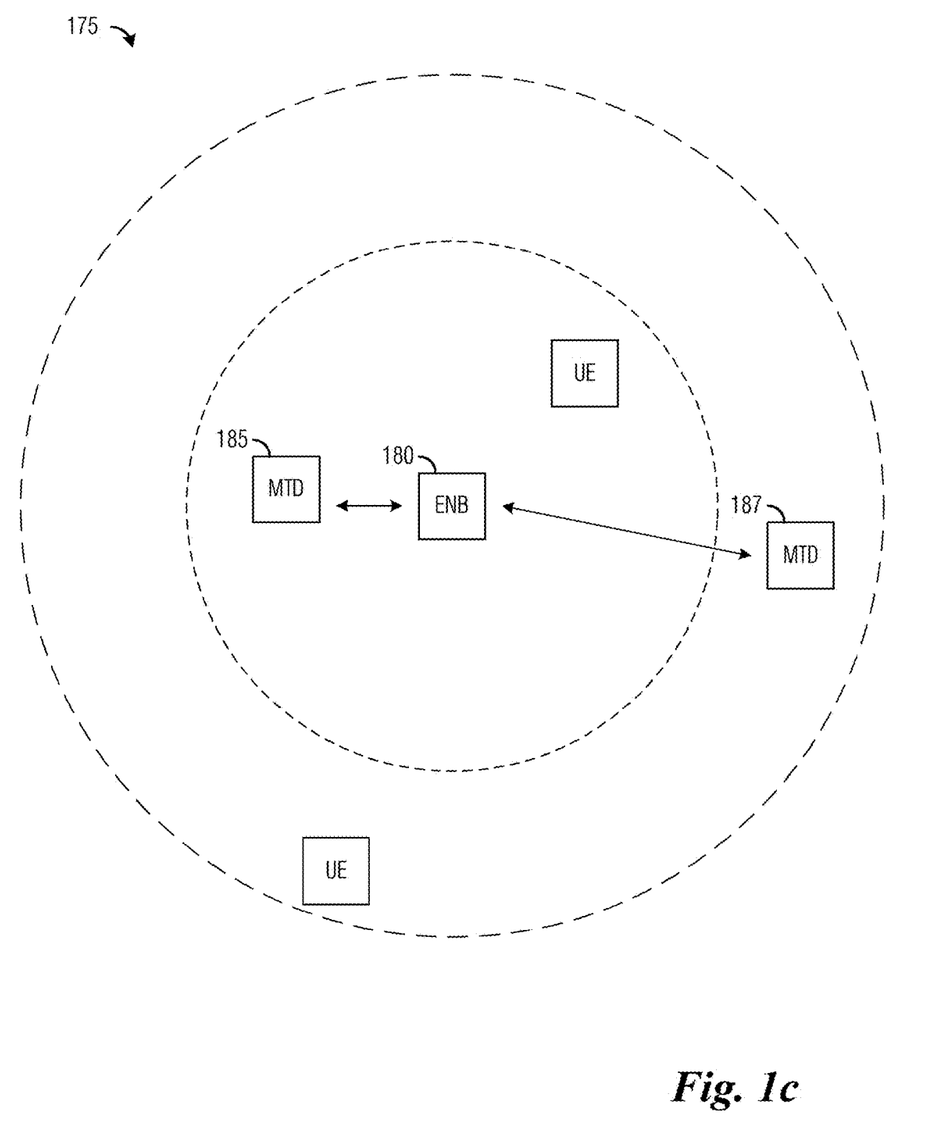
FIG. 1c illustrates a portion of a third example communications system highlighting coverage range with MTDs and MTC according to example embodiments described herein.

FIG. 1c illustrates a portion of a third example communications system 175 highlighting coverage range with MTDs and MTC. Communications system 175 includes an eNB 180 serving a first MTD 185 and a second MTD 187. First MTD 185 is operating relatively close to eNB 180, while second MTD 187 is operating remotely from eNB 180. Since second MTD 187 is located far away from eNB 180 (when compared to first MTD 185), extended coverage (or similarly, extended range) is needed to provide coverage for second MTD 187.

In a cellular communications system, such as a 3GPP Long Term Evolution (LTE) compliant communications, uplink transmissions from various UE are adjusted with respect to timing to help ensure that the transmission arrive at the eNB at substantially the same time. The strict synchronous operation requirement arises from the rectangular pulses used in orthogonal frequency division multiplexed (OFDM) that present large side lobes in the frequency domain. Therefore, communications systems utilizing OFDM require synchronization in the time domain and the frequency domain to retain orthogonality among the different subcarriers.

However, for MTDs, which may be inactive for extended amounts of time, maintaining synchrony may be difficult and may require a significant amount of additional complexity. Furthermore, MTC traffic usually occurs in short packets, and the signaling overhead associated with synchronization may be large with respect to the small amount of data. Hence, asynchronous operation is a desired feature.

Figure 2:
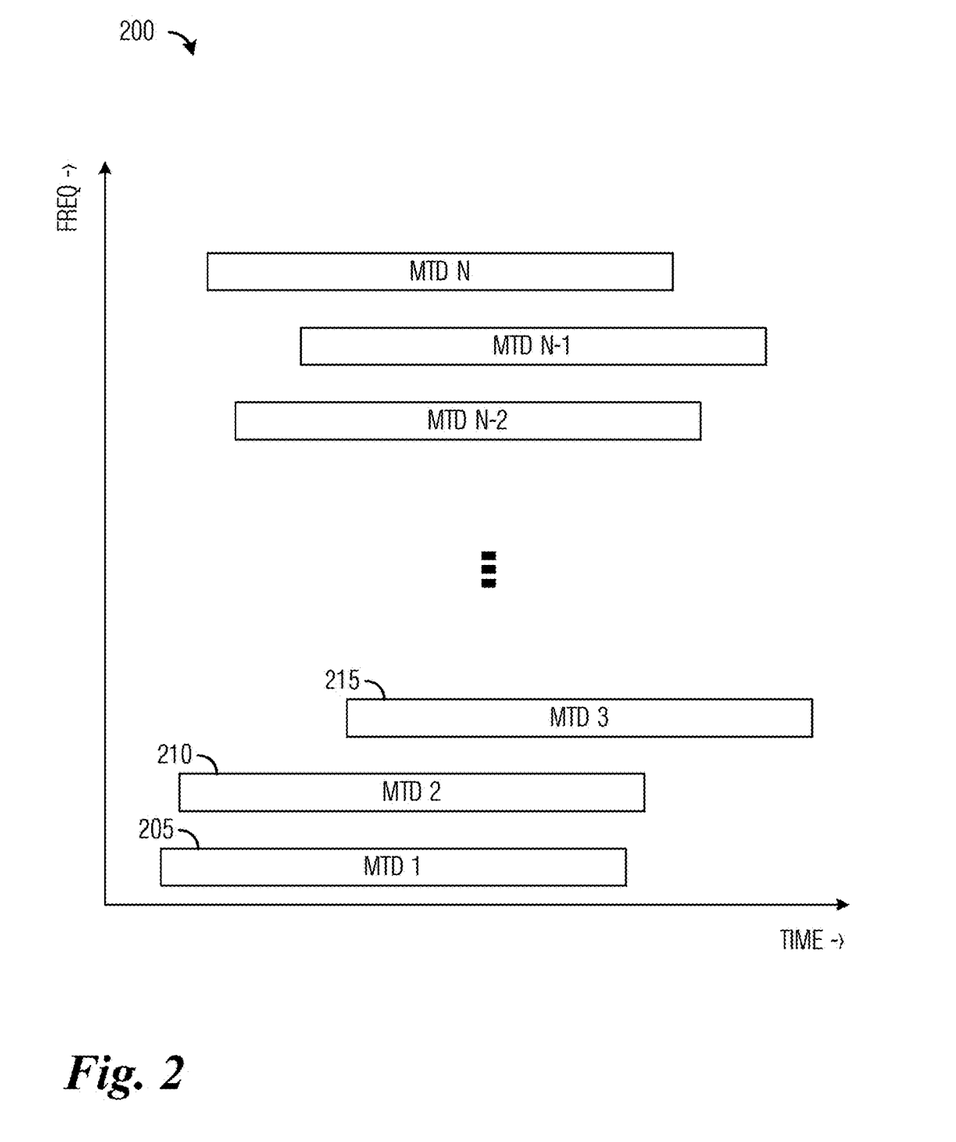
FIG. 2 illustrates a plot of example transmissions made by a plurality of MTDs according to example embodiments described herein.

FIG. 2 illustrates a plot 200 of example transmissions made by a plurality of MTDs. The transmissions made by the plurality of MTDs, such as transmission 205 by MTD 1, transmission 210 by MTD 2, and transmission 215 by MTD 3, in an asynchronous manner. Even if there was intent to make the transmissions in a synchronous manner, factors, such as propagation delay, clock drift, and the like, may cause the transmissions to occur at different times. In order to maintain synchrony, elaborate coordination techniques may need to be employed. As an example, the MTDs may need to detect a periodic synchronization broadcast made by the eNB to resynchronize their clocks. The MTDs may also receive timing adjustment information that may be used to adjust their clocks to help ensure that the transmission arrive at the eNB in synchrony. However, detecting the periodic synchronization broadcast (and potentially the timing adjustment information) means that the MTDs must be awake to receive the synchronization broadcast. Forcing the MTDs to periodically wake up to detect the periodic synchronization broadcast may significantly increase power consumption in the MTDs. Since many MTDs are battery powered, increasing their power consumption will dramatically reduce the battery life of the MTDs. It is noted that an open-loop synchronization technique may be implemented based on received downlink transmissions, such as received beacons, to provide a measure of synchronization. However, open-loop synchronization generally does not employ timing adjustment information.

According to an example embodiment, in order to support the sharing of available communications resources (e.g., time resources, frequency resources, or time-frequency resources), narrow band communications is used. In general, narrow band communications uses channels (or frequency bands) that do not exceed or significantly exceed the channels' coherence bandwidth (a range of frequencies that the channel can be considered to be flat). Transmissions from a single MTD occupies a single narrow band channel that does not overlap with other narrow band channels. Multiple access techniques, such as frequency division multiple access (FDMA), code division multiple access (CDMA), time division multiple access (TDMA), carrier sense multiple access (CSMA), CSMA with collision detection (CSMA/CD), and the like, may be used to allow more than one MTD to share communication resources and increase the number of MTDs supported. Furthermore, a single carrier is used. Offset Quadrature Amplitude Modulation (OQAM) modulation may be used to modulate the information being transmitted. Although the discussion focuses on the use of OQAM, other modulation techniques, such as Quadrature Phase Shift Keying (QPSK), MSK (minimum shift keying), Quadrature Amplitude Modulation (QAM), and the like, may be used.

The use of single carrier modulation may offer a lower peak to average power ratio (PAPR) and/or complexity than multicarrier waveforms. Also, offset modulation, such as OQPSK, may be more efficient for nonlinear power amplifiers due to the 90 degree phase shift in OQPSK rather than the 180 degree phase shift for regular QPSK. Therefore, hardware to support the MTC may be more energy efficient, providing a low power and low cost implementation.

According to an example embodiment, a frequency localized pulse shaping filter is used to minimize out-of-band emissions. Minimizing the out-of-band emissions of the MTDs may allow for the asynchronous transmissions by multiple MTDs without causing interference to each other. An example of a frequency localized pulse shaping filter is a root raise cosine filter, e.g., a RRC pulse. Although the discussion focuses on the use of the RRC pulse as the frequency localized pulse shaping filter, other filters may be used, for example, the isotropic orthogonal transform algorithm (IOTA) filter. Additionally, guard tones are used between transmissions of MTDs to enable interference free asynchronous transmission due to the low out-of-band emission of the pulses, which ensures orthogonality of the waveforms from different MTDs by separating them in the frequency domain. The guard tones may be with respect to OFDM and/or OQAM.

According to an example embodiment, the signal waveform of generalized frequency division multiplexing (GFDM) or single carrier GFDM may be used in an MTC communications system. In such a situation, GFDM may utilize frequency localized pulse shaping on each subcarrier. Therefore, GFDM may possess an advantage of low out-of-band emission in comparison to OFDM. GFDM may also have a reduced cyclic prefix (CP) when compared to GFDM. Furthermore, single carrier GFDM (SC-GFDM), which is a version of GFDM with only a single sub-carrier, has a very low peak-to-average power ratio (PAPR). Hence, SC-GFDM may be a good candidate for use in an MTC communications system.

According to an example embodiment, in order to achieve extended or enhanced coverage for low signal plus interference to noise ratio (SINR) MTDs, ultra narrow band transmissions with long signaling pulses are used in place of repetition. Additionally, transmission pulse bandwidth can be adjustable to meet MTD needs and/or communications system condition. The adjustment of the transmission bandwidth can enable energy consumption savings when needed and/or possible.

Usually, in power limited situations, narrower bandwidths may allow the MTD to concentrate the transmit power in a narrow spectrum, thereby increasing the transmit power spectrum density. In the time domain, the longer pulse means that energy per symbol can be accumulated over a longer period of time, hence, increasing the signal to noise ratio (SNR). The advantages of using narrow bandwidth signals can be shown using a simple capacity formula. In a power limited situation, the capacity C for a single MTD i may be expressed as:

$$C_i = W_i \log(1+SNR_{W_i}),$$

where $W_i$ is the bandwidth allocated to MTD i. Assuming that the transmit power of the MTD is fixed at its maximum, then $SNR_{W_i}$ is expressible as:

$$SNR_{W_i} = \frac{P_t}{P_L N_0 W_i},$$

where $P_t$ is the transmit power, $P_L$ is the path-loss, and $N_0$ is the noise power spectral density. It is noted that $SNR_{W_i}$ is inversely proportional to the allocated bandwidth.

When the SNR is low, the capacity is expressible as:

$$C_i = W_i \log\left(1 + \frac{P_t}{P_L N_0 W_i}\right) \approx \frac{P_t}{P_L N_0}.$$

Therefore, increasing the bandwidth of the channel does not gain extra throughput. However, reducing the bandwidth allows more MTDs to transmit due to more available channels. Therefore, for low SINR MTDs, using narrow band channels is an effective technique to improve coverage while allowing as many MTDs to communicate as possible.

Furthermore, the use of long signaling pulses may allow for increased resilience to synchronization errors. Even with open-loop synchronization, performance degradation due to overlapping in time between consecutive MTDs may be negligible.

Figure 3:
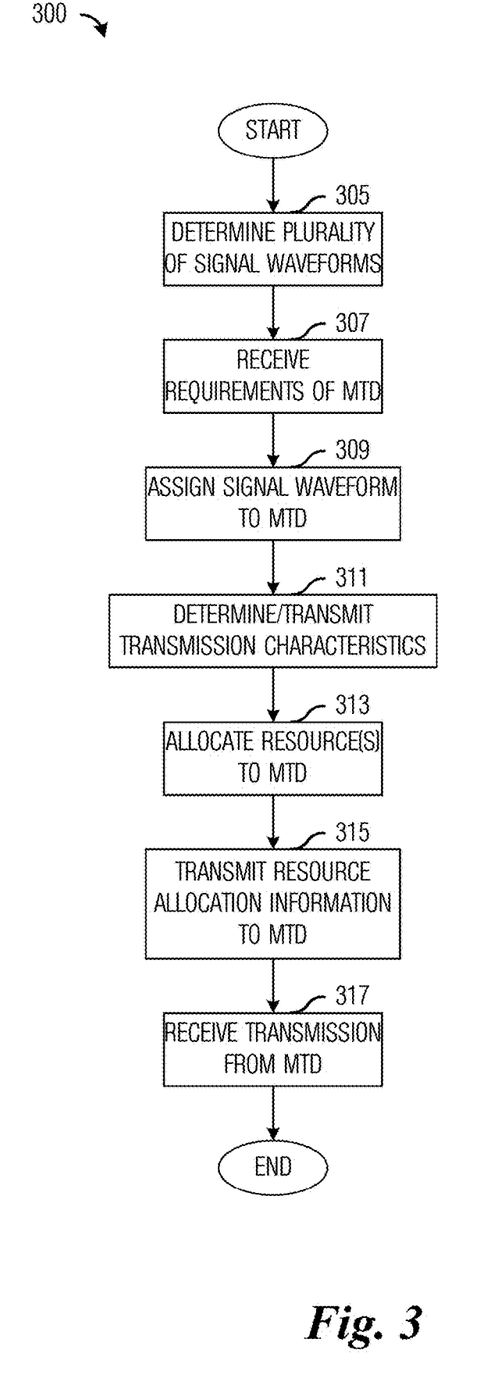
FIG. 3 illustrates a flow diagram of example operations occurring in an eNB as the eNB participates in MTC according to example embodiments described herein.

FIG. 3 illustrates a flow diagram of example operations 300 occurring in an eNB as the eNB participates in MTC. Operations 300 may be indicative of operations occurring in an eNB, such as eNBs 105, 155, and 180, as the eNB participates in MTC with a MTD.

Operations 300 may begin with the eNB determining a plurality of signal waveforms (block 305). The plurality of signal waveforms may include single carrier waveforms, multi-carrier waveforms, single carrier narrow-band waveforms, single carrier ultra narrow-band waveforms, and the like, with potentially different bandwidths. Some types of waveforms may have multiple different bandwidths, while other types may have a single bandwidth. The particular configuration of the signal waveforms in the plurality of signal waveforms may depend on implementation, communications system capability, MCS levels supported, and the like.

The eNB may receive communications requirements of a MTD (block 307). As an example, the eNB may receive the communications requirements of the MTD during an initial attachment procedure that is performed with the MTD. As another example, the eNB may receive the communications requirements of the MTD during a handover procedure that is performed with the MTD. As yet another example, the eNB may receive the communications requirements of the MTD when the MTD updates and changes its communications requirements. As an illustrative example, the communications requirements of the MTD may include parameters specifying the communications requirements of the MTD, such as a frequency or period of transmissions from the MTD, an amount of information transmitted per transmission, a bandwidth requirement of the MTD, a priority level of the MTD and/or the communications, coverage requirement, a communications system load, MTD geometry, MTD power consumption, and the like.

The eNB may assign a signal waveform out of the plurality of signal waveforms to the MTD (block 309). The assignment of the signal waveform may be in accordance with communications requirements of the MTD. According to an example embodiment, multiple signal waveforms may be assigned to the MTD. As an illustrative example, if the MTD has different communications requirements, more than one signal waveform may be assigned to the MTD to meet the different communications requirements. The eNB may determine transmission characteristics, e.g., the bandwidth and/or a MCS level, for the MTD and transmit the transmission characteristics to the MTD (block 311). The transmission characteristics (e.g., bandwidth and/or the MCS level) may be determined in accordance with signal waveform assigned to the MTD. As an example, a MTD that has high bandwidth requirements may be assigned a signal waveform with a wide bandwidth. Furthermore, the eNB may assign the signal waveform with the MCS level set in accordance with the allocated bandwidth. As an illustrative example, if the MTD is a sensor that may transmit 1 kilo-bit of data once every 10 seconds, the eNB may allocate a 100 kilo-hertz wide channel to the MTD so that it can transmit its 1 kilo-bit of data in about 0.01 seconds. Alternatively, the eNB may assign the signal waveform in accordance with factors such as MTD type, MTD priority, communications system load, and the like. As an illustrative example, the eNB may have the plurality of signal waveforms with each preselected for different MTD types (or MTD priority, channel quality, data load, and the like). The eNB may simply select a signal waveform of the plurality of signal waveforms in accordance with the MTD type (or MTD priority, channel quality, data load, and the like) and total communication system load and transmit an indicator of the signal waveform to the MTD.

Figure 4:
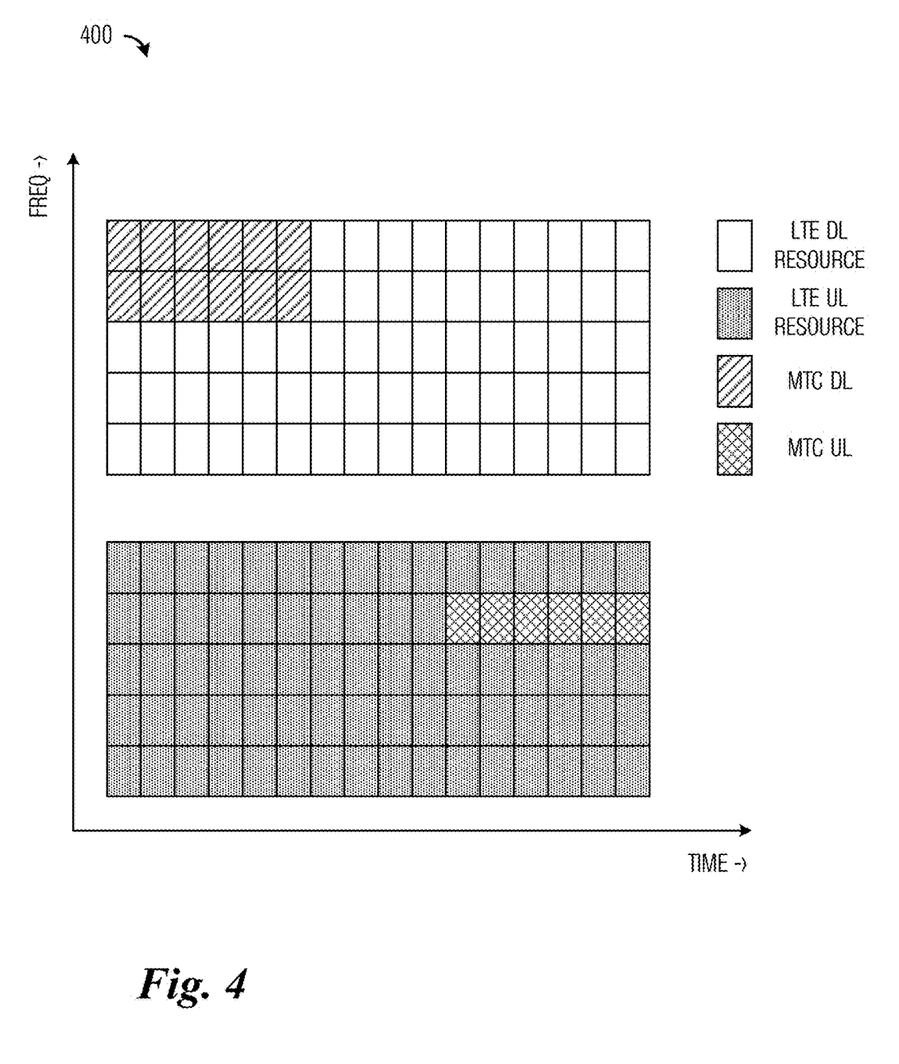
FIG. 4 illustrates a diagram of example communications resources in a 3GPP LTE communications system according to example embodiments described herein.

The eNB may allocate a communications resource(s) to the MTD in accordance with the communications requirements (block 313). As an illustrative example, the eNB may allocate time-frequency resources commensurate with the communications requirements of the MTD and/or the communications characteristics for the MTD. The eNB may also consider the communications requirements of other MTDs served by the eNB, as well as other factors, such as communications system load, communications system condition, and the like, as it allocates communications resources. The allocation of the resources may be a persistent or semi-persistent allocation to meet the on-going communications requirements of the MTD. As an illustrative example, the eNB may allocate the time-frequency resources in a periodic manner based on the frequency or period of the transmissions as specified by the MTD. FIG. 4 illustrates a diagram of example communications resources 400 in a 3GPP LTE communications system. Communications resources 400 may include resources for uplink transmissions and downlink transmissions. Some of the communications resources may be allocated for MTC, while a remainder of the communications resources is allocated for 3GPP LTE communications. The eNB may allocate one or more of the network resources to the MTD.

Referring back now to FIG. 3, the eNB may transmit resource allocation information to the MTD (block 315).

The resource allocation information may specify where and when the allocated communications resource(s) can be found by the MTD. As an illustrative example, the resource allocation information may include a time, a frequency, a frame number, and the like, so that the MTD knows where and when to transmit. The resource allocation information may be transmitted to the MTD during the attachment procedure, the handover procedure, broadcast to the MTD, and the like. The eNB may receive a transmission from the MTD in accordance with the resource allocation information (block 317). The transmission may be transmitted using the signal waveform.

Figure 5:
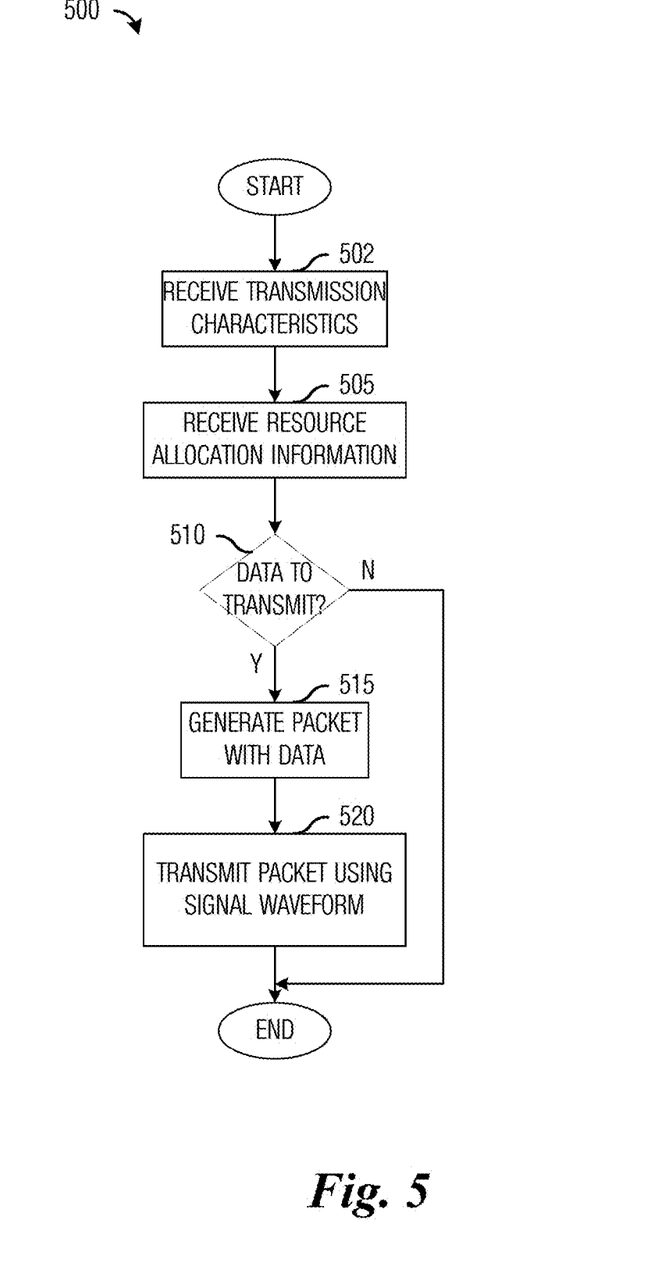
FIG. 5 illustrates a flow diagram of example operations occurring in a MTD as the MTD participates in MTC according to example embodiments described herein.

FIG. 5 illustrates a flow diagram of example operations 500 occurring in a MTD as the MTD participates in MTC. Operations 500 may be indicative of operations occurring in a MTD, such as MTDs 114, 116, 160, 162, 164, 185, and 187, as the MTD participates in MTC.

Operations 500 may begin with the MTD receiving transmission characteristics from an eNB (block 502). The transmission characteristics, e.g., bandwidth allocation and/or MCS, may inform the MTD information about the signal waveform to be used by MTD, as well as a MCS level to be used for the transmission. The transmission characteristics may be received during an initial attachment procedure, a handover procedure, and the like. Alternatively, the transmission characteristics may be received after the eNB adjusts the bandwidth and/or MCS level of the signal waveform to meet changing communications system load. According to an example embodiment, the MTD may receive information about multiple signal waveforms if multiple signal waveforms were assigned to the MTD.

The MTD may receive resource allocation information from the eNB (block 505). The resource allocation information may specify where and when the allocated communications resource(s) can be found by the MTD. As an illustrative example, the resource allocation information may include a time, a frequency, a frame number, and the like, so that the MTD knows where and when to transmit. The resource allocation information may have been generated by the eNB in response to communications requirements of the MTD, which may have been provided by the MTD. Alternatively, the communications requirements of the MTD may one of several default communications requirements associated with MTD type, priority, and the like.

The MTD may receive the resource allocation information during the attachment procedure, the handover procedure, in a broadcast or transmission to the MTD, and the like. The MTD may perform a check to determine if it has data (information) to transmit (block 510). If the MTD has data to transmit, the MTD may generate a packet(s) including the data (block 515). The generation of the packet(s) may include placing the data into a payload of the packet(s), adding header(s) and/or footer(s) along with control information, encoding to provide error detection and/or correction, and the like. The MTD may transmit the generated packet in accordance with the resource allocation information (block 520). Transmitting the generated packet may include operations such as digital to analog conversion, filtering with a frequency localized pulse shaping filter, such as a RRC pulse, modulation using OQAM, signal amplification, and the like. The transmission of the packet(s) may make use of the signal waveform.

According to an example embodiment, the bandwidth allocated to a MTD may be varied (adjusted) to meet communications requirements of the MTD and/or communications system conditions. As discussed previously, if maximizing the number of MTDs supported is a goal, when the MTDs are limited in power, a narrow bandwidth is typically advantageous as it boosts total transmit power or power spectrum density, thereby allowing the support of more MTDs. However, the use of narrow bandwidths for all MTDs restricts performance for MTDs that are not power limited or MTDs that have good channel conditions (i.e., good channel SINR). Additionally, power consumption in a MTD typically increases as the MTD takes longer to transmit when using a narrow bandwidth channel when compared to a wide bandwidth channel is used. Furthermore, in a communications system that uses a fixed size guard band, the fixed size guard band consumes greater overhead when used in conjunction with a narrow bandwidth channel (especially when the guard band is wider than the narrow bandwidth channel) then when used with a wide bandwidth channel. Also, limitations on throughput (the bandwidth of the channel) may prevent the support of diverse MTDs that require different data rates. In addition, energy consumption is usually important in MTC applications since many sensors are battery powered and battery life is an important consideration in designing MTD systems.

Figure 6:
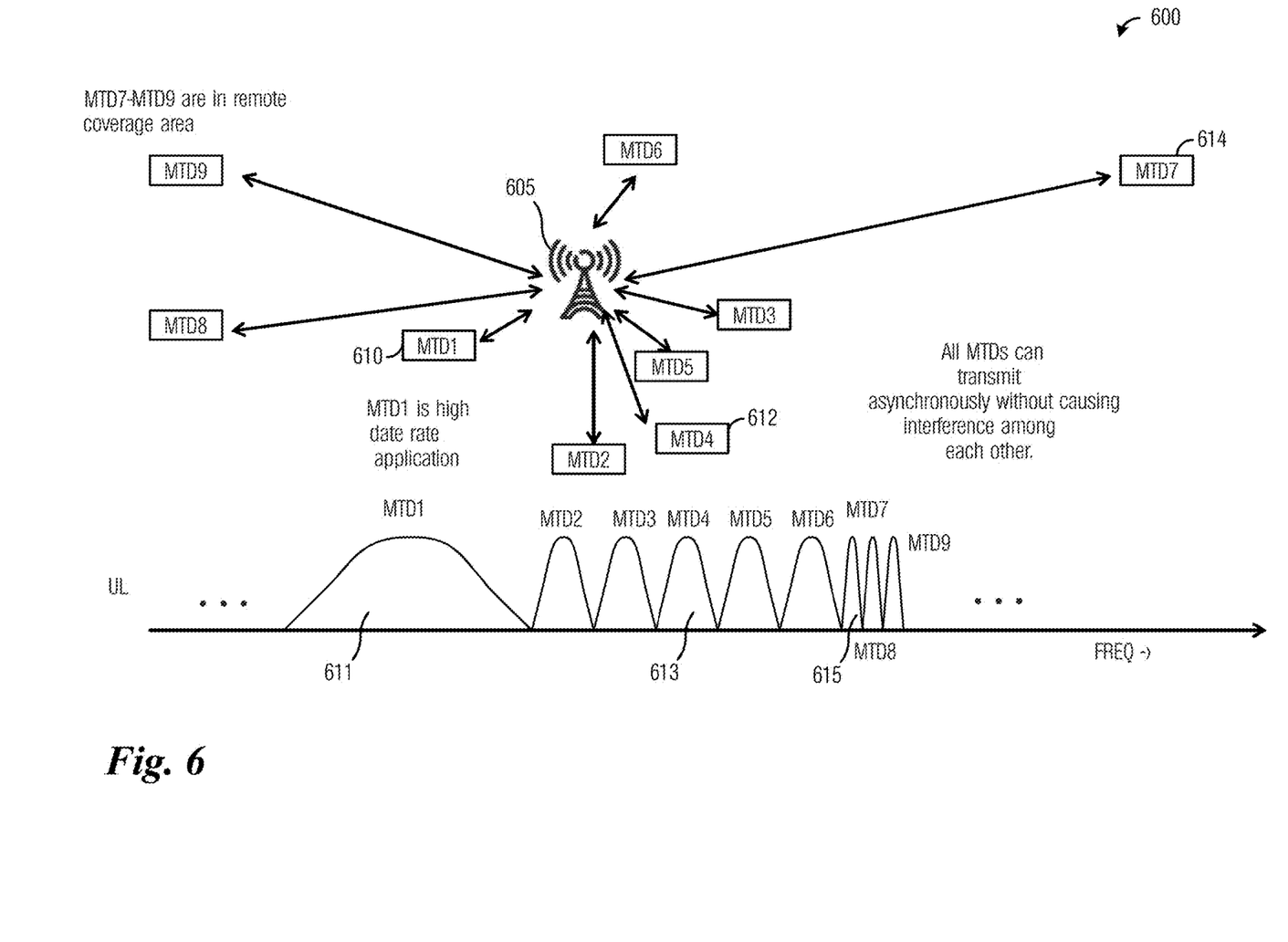
FIG. 6 illustrates a diagram of a communications system that supports adjustable bandwidth for MTDs according to example embodiments described herein.

When the communications system is underloaded, signal waveforms with larger bandwidths may be assigned to MTDs to improve energy efficiency, while when the communications system is overloaded, signal waveforms with narrow bandwidths may be used to support as many MTDs as possible. Hence, a bandwidth adjusting technique may consider both long term channel characteristics of MTDs, such as SINR, as well as the load of the communications system. In addition, energy efficiency of remote MTDs may be more important than energy efficiency of close MTDs since they may be more likely to run out of battery due to increased transmission time for the same data load. FIG. 6 illustrates a diagram of a communications system 600 that supports adjustable bandwidth for MTDs. Communications system 600 includes an eNB 605 communicating with a plurality of MTDs. Distance between eNB 605 and the MTDs differ, therefore, the channel condition for the MTDs may also differ. As an illustrative example, MTD 610 is very close to eNB 605 and has a high SINR channel, MTD 612 is relatively close to eNB 605 and has a medium SINR channel, while MTD 614 is far from eNB 605 and has a low SINR channel.

As discussed previously, eNB 605 may be able to adjust the bandwidths used for MTC in accordance with the channel condition of the MTDs as well as the load of communications system 600. For illustrative purposes, consider a situation where communications system 600 is lightly loaded and permits the adjustment of bandwidths. Then, MTD 610 with a high SINR channel can have its bandwidth increased significantly (as shown in pulse 611), and MTD 612 with a medium SINR channel can have its bandwidth increased (shown as pulse 613) but not to the extent of pulse 611. However, MTD 614 with a low SINR channel cannot have its bandwidth increased (shown as pulse 615). MTD 614 may need to rely upon a signal waveform with a narrow bandwidth and long pulse signaling to obtain extended coverage from eNB 605.

Figure 7:
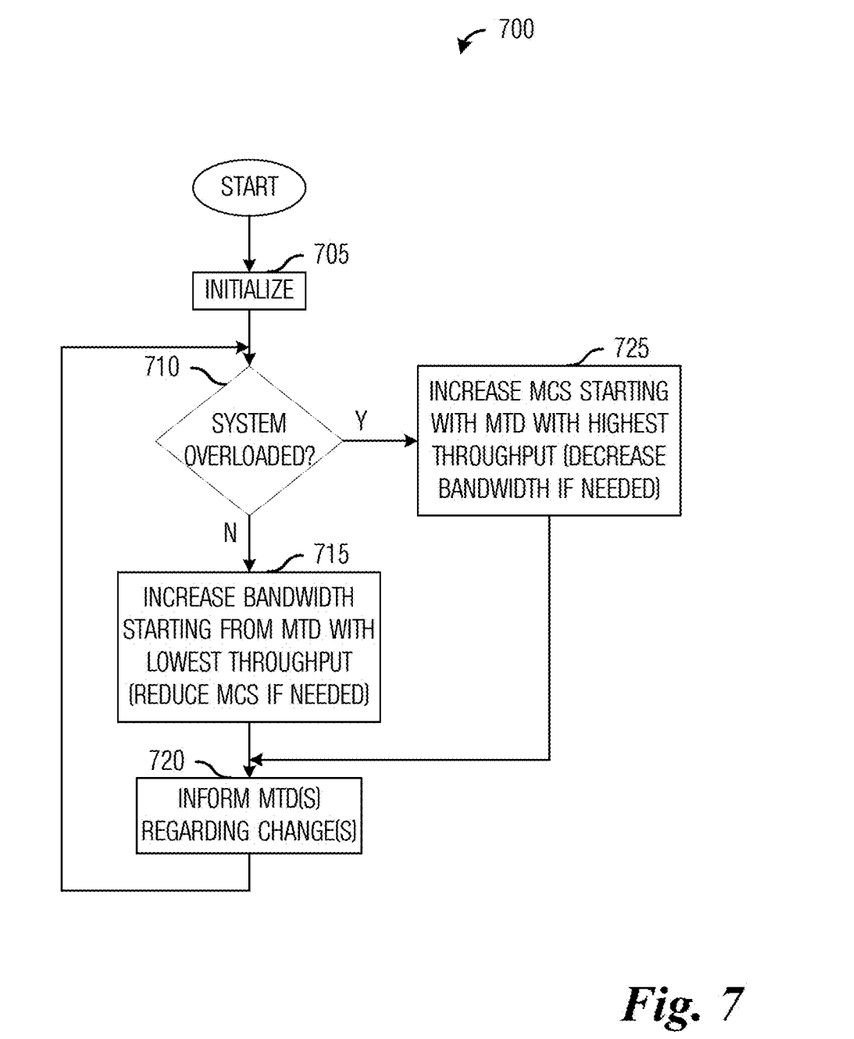
FIG. 7 illustrates a flow diagram of example operations occurring in an eNB as the eNB adjusts the channel characteristics of channels of MTDs according to example embodiments described herein.

FIG. 7 illustrates a flow diagram of example operations 700 occurring in an eNB as the eNB adjusts the transmission characteristics of MTDs. Operations 700 may be indicative of operations occurring in an eNB, such as eNBs 105, 155, and 180, as the eNB adjusts the transmission characteristics of channels of MTDs.

Operations 700 may begin with the initialization of the communications system (block 705). According to an example embodiment, the initialization may include a definition of possible transmission characteristics, e.g., possible modulation and coding scheme (MCS) levels, as well as bandwidth choices. The initialization may be met by defining a plurality of signal waveforms with a variety of MCS levels and bandwidth choices. As an illustrative example, a minimum MCS level may be OQPSK modulation with a code rate of ⅓, while a highest MCS level may be dependent on the importance of energy efficiency, an example of which may be 16-QAM with a code rate of ¾. Similarly, a minimum bandwidth may be set with consideration being given to radio-frequency limits of frequency offset. The number of MCS levels and/or bandwidth choices may be determined as a trade-off between overhead (e.g., signaling overhead required to signal changes, signaling overhead required to report channel condition, computational overhead required to adjust the bandwidth, the computational overhead required to determine load condition of the communications system, and the like) and performance.

The eNB may perform a check to determine if the communications system is overloaded (block 710). If the communications system, in particular, the eNB and possibly some of its neighbor eNBs, are not overloaded, the eNB may increase the bandwidth for at least some of its MTDs (block 715). In general, the eNB may increase the bandwidth by selecting a signal waveform with the desired bandwidth and/or MCS level. In an underloaded situation, it may be important for MTDs to have high energy efficiency while saving battery power. The eNB may allocate maximum supported bandwidth at the lowest MCS level without repetition to the MTDs. Higher MCS levels may be used if the MTD can support that MCS levels with maximum bandwidth. The eNB may reduce MCS level if needed while increasing the bandwidth. The eNB may examine all of its MTDs, starting with a MTD with the lowest throughput, for example, and increase the bandwidth for the MTDs that can benefit from the bandwidth increase. As an example, if the MTD with the lowest throughput has a very low SINR, then the MTD may not be a good candidate for a bandwidth increase. However, a MTD with a medium or better SINR may be a good candidate for a bandwidth increase. According to an example embodiment, the increase in bandwidth for a MTD is selected in accordance with performance factors. Examples of performance factors include data transmission requirements of the MTD (if the MTD has very low data transmission requirements, it may not be advantageous to increase the bandwidth of the MTD, for example), the channel condition of the MTD, available capacity of the communications system, the number of MTDs suitable for bandwidth increase, and the like.

If the eNB made changes to the bandwidth (and/or MCS level) of any of its MTDs, the eNB may inform the MTD(s) of the change (block 720). The eNB may broadcast information regarding the changes or it may individually transmit the information to the affected MTDs.

If the communications system, in particular, the eNB and possibly some of its neighbor eNBs, are overloaded, the eNB may increase the MCS level for at least some of its MTDs (block 725). In general, the eNB may increase the MCS level by selecting a signal waveform with the desired MCS level and/or bandwidth. In an overloaded situation, the eNB may maximize the number of MTDs. Therefore, spectral efficiency may be more important and the eNB may use the minimum bandwidth and only increase the bandwidth if the MTDs can support higher MCS levels with greater signal pulse bandwidth. The eNB may reduce the bandwidth if needed while increasing the MCS level. The eNB may examine all of its MTDs, starting with a MTD with the highest throughput, for example, and increase the MCS level for the MTDs that can benefit from the MCS increase. If the eNB made changes to the MCS level (and/or bandwidth) of any of its MTDs, the eNB may inform the MTD(s) of the change (block 720). The eNB may broadcast information regarding the changes or it may individually transmit the information to the affected MTDs.

It is noted that in a medium load situation, where the communications system is neither overloaded nor underloaded, the selection of bandwidth and/or MCS level may push the communications system into either overload or underload. In such a situation, the eNBs may set the MTDs assuming that the communications system is in an underloaded condition to help preserved the batter power of the MTDs. The eNB may then gradually increase the MCS level of the MTDs while reducing bandwidth (if needed) to support the higher MCS level. A decision to be made in the medium load situation is which MTD's MCS level should be increased first. In other words, how to ensure fairness for the MTDs. As an example, the MTDs that are farther away from the eNB may be prioritized since their batteries tend to deplete faster due to operation under low bandwidth conditions. In such a situation, MTD throughput may be used as a deciding factor. As an illustrative example, a MTD having the highest throughput may be selected and its MCS level may be increased and bandwidth may be decreased (if necessary).

Figure 8:
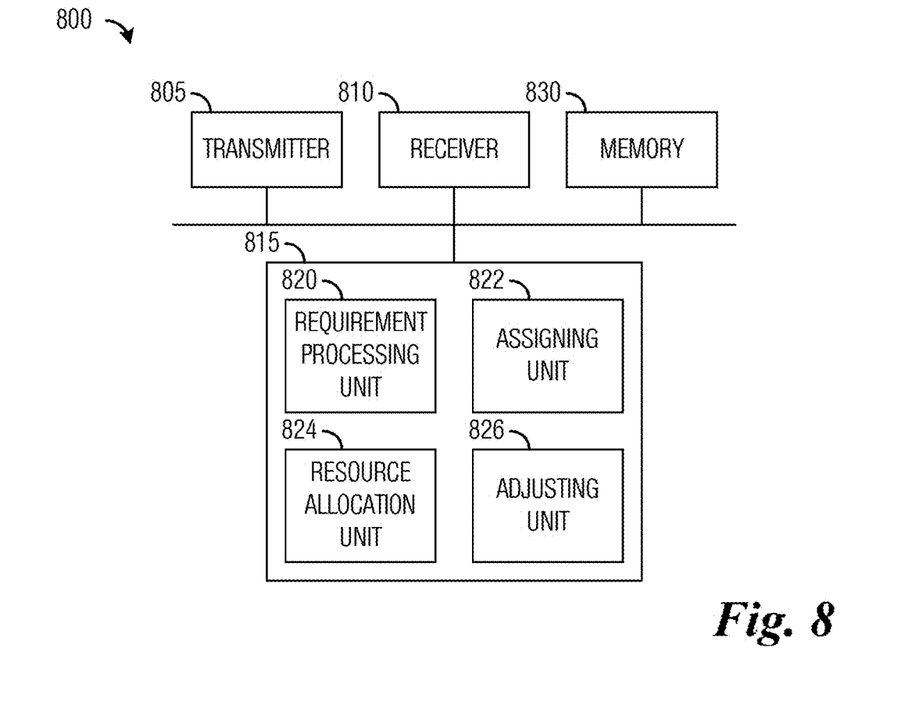
FIG. 8 illustrates an example first communications device according to example embodiments described herein.

FIG. 8 illustrates an example first communications device 800. Communications device 800 may be an implementation of a communications controller, such as an eNB, a base station, a NodeB, a controller, and the like. Communications device 800 may be used to implement various ones of the embodiments discussed herein. As shown in FIG. 8, a transmitter 805 is configured to transmit packets, resource allocation information, and the like. Communications device 800 also includes a receiver 810 that is configured to receive packets, communications requirements, and the like.

A requirement processing unit 820 is configured to process communications requirements from a MTD. The communications requirements may specify parameters, such as coverage requirement, a communications system load, MTD geometry, MTD power consumption, frequency or period of transmissions from the MTD, an amount of information transmitted per transmission, a priority level of the communications, and the like. An assigning unit 822 is configured assign a signal waveform to a MTD in accordance with communications requirements of the MTD. Assigning unit 822 is configured to select the signal waveform from a plurality of signal waveforms. A resource allocation unit 824 is configured to allocate communications resources for the MTD in accordance with the communications requirements. Resource allocation unit 824 is configured to consider communications requirements from MTDs served by communications device 800, condition of a communications system that includes communications device 800, and the like. An adjusting unit 826 is configured to adjust transmission parameters, e.g., bandwidth and/or MCS level, of MTD. Adjusting unit 826 is configured to consider communications system load, as well as channel condition (e.g., SINR, SNR, and the like), as it adjusts the bandwidth and/or MCS level. Adjusting unit 826 is configured to generate signaling to inform MTDs regarding any adjustments in their bandwidth and/or MCS level. A memory 830 is configured to store transmission parameters, communications requirements, resource allocations, resource allocation information, channel parameters, bandwidth assignments, MCS level assignments, channel condition, communications system load, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while requirement processing unit 820, assigning unit 822, resource allocation unit 824, and adjusting unit 826 may be software modules executing in a microprocessor (such as processor 815) or a custom circuit or a custom compiled logic array of a field programmable logic array. Requirement processing unit 820, assigning unit 822, resource allocation unit 824, and adjusting unit 826 may be modules stored in memory 830.

Figure 9:
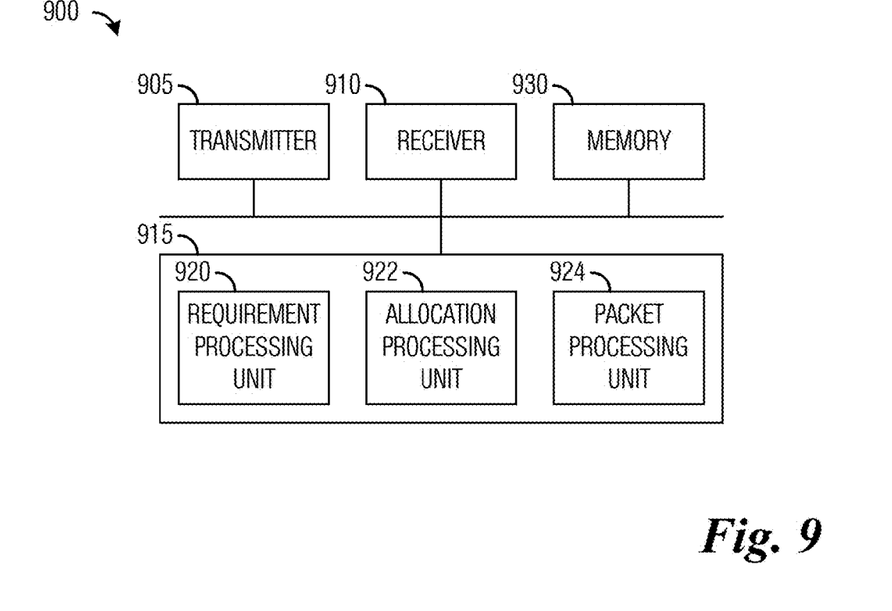
FIG. 9 illustrates an example second communications device according to example embodiments described herein.

FIG. 9 illustrates an example second communications device 900. Communications device 900 may be an implementation of a MTD, and the like. Communications device 900 may be used to implement various ones of the embodiments discussed herein. As shown in FIG. 9, a transmitter 905 is configured to transmit packets, communications requirements, and the like. Communications device 900 also includes a receiver 910 that is configured to receive packets, resource allocation information, and the like.

A requirement processing unit 920 is configured to generate communications requirements for communications device 900. The communications requirements may specify parameters, such as frequency or period of transmissions from the MTD, an amount of information transmitted per transmission, a priority level of the communications, and the like. Requirement processing unit 920 is configured to generate messaging for transmitting the communications requirements. An allocation processing unit 922 is configured to process resource allocation information received by communications device 900 to determine transmission opportunities for communications device 900. Allocation processing unit 922 is configured to process transmission characteristics of a signal waveform. A packet processing unit 924 is configured to process packets received by communications device 900. Packet processing unit 924 is configured to process packets containing bandwidth and/or MCS level adjustments. A memory 930 is configured to store communications requirements, resource allocations, resource allocation information, bandwidth assignments, MCS level assignments, channel condition, communications system load, channel parameters, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while requirement processing unit 920, allocation processing unit 922, and packet processing unit 924 may be software modules executing in a microprocessor (such as processor 915) or a custom circuit or a custom compiled logic array of a field programmable logic array. Requirement processing unit 920, allocation processing unit 922, and packet processing unit 924 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for operating a communications controller, the method comprising:
   determining, by the communications controller, communications requirements for a machine-type device (MTD) configured to perform machine-to-machine (M2M) communications;
   assigning, by the communications controller, a first signal waveform selected from a plurality of signal waveforms to the MTD in accordance with the determined communications requirements, wherein each signal waveform has an associated characteristic signal bandwidth; and
   transmitting, by the communications controller, information about the first signal waveform to the MTD.

2. The method of claim 1, further comprising receiving, by the communications controller, a packet from the MTD, wherein the packet is transmitted using the first signal waveform.

3. The method of claim 1, further comprising receiving the plurality of signal waveforms.

4. The method of claim 1, further comprising retrieving the plurality of signal waveforms from a remote database.

5. The method of claim 1, wherein the information about the first signal waveform comprises transmission characteristics of a communications channel used to transmit the first signal waveform.

6. The method of claim 5, wherein the transmission characteristics comprises at least one of a bandwidth associated with the MTD, and a level of a modulation and coding scheme (MCS) used for transmission.

7. The method of claim 6, further comprising:
   altering the transmission characteristics of the communications channel in accordance with at least one of a channel condition of the communications channel, and a system load of the communications controller;
   assigning a second signal waveform selected from the plurality of signal waveforms to the MTD in accordance with the altered transmission characteristics; and
   transmitting information about the second signal waveform to the MTD.

8. The method of claim 7, wherein altering the transmission characteristics comprises:
   increasing the level of the MCS in response to determining that the system load of the communications controller is overloaded; and
   increasing the bandwidth associated with the MTD in response to determining that the system load of the communications controller is underloaded.

9. The method of claim 8, wherein increasing the level of the MCS further comprises reducing the bandwidth associated with the MTD.

10. The method of claim 8, wherein increasing the bandwidth associated with the MTD further comprises reducing the level of the MCS.

11. The method of claim 1, wherein the communications requirements comprise at least one of a coverage requirement, a communications system load, MTD geometry, MTD power consumption, a frequency of transmissions made by the MTD, a bandwidth requirement of the MTD, an amount of data to be transmitted by the MTD, a priority level of the MTD, and a priority level of transmissions made by the MTD.

12. The method of claim 1, wherein the plurality of signal waveforms comprises at least one of a single carrier waveform, a single carrier narrow-band waveform, a single carrier ultra-narrow-band waveform, and a multi-carrier waveform.

13. The method of claim 1, wherein assigning the first signal waveform comprises assigning an ultra narrow-band single carrier waveform to MTD, wherein the signal bandwidth of the ultra narrow-band single carrier waveform is narrow enough such that no repetition coding is needed for the communication controller to provide enhanced coverage to the MTD.

14. The method of claim 1, further comprising assigning a third signal waveform selected from the plurality of signal waveforms to the MTD in accordance with the determined communications requirements.

15. A method for operating a machine-type device (MTD), the method comprising:
transmitting communications requirements of the MTD to a communications controller, the communications requirements of the MTD being used to assign a signal waveform having an associated characteristic signal bandwidth to the MTD, wherein the MTD is configured to perform machine-to-machine (M2M) communications;
receiving, by the MTD, transmission characteristics of the signal waveform from the communications controller, wherein the transmission characteristics include at least one of a bandwidth associated with the MTD, and a level of a modulation and coding scheme (MCS) used for transmission;
generating, by the MTD, a packet including data to be transmitted; and
transmitting, by the MTD, the packet to the communications controller in accordance with the transmission characteristics, wherein the packet is transmitted using the signal waveform.

16. The method of claim 15, wherein transmitting the packet comprises modulating the packet with offset quadrature amplitude modulation.

17. The method of claim 16, wherein transmitting the packet comprises filtering the modulated packet with a frequency localized pulse shaping filter.

18. The method of claim 15, wherein the signal waveform used for transmitting the packet is one of Generalized Frequency Division Multiplexing (GFDM) and single carrier GFDM.

19. The method of claim 15, wherein the signal waveform used for transmitting the packet is an ultra narrow-band single carrier waveform, and wherein a characteristic signal bandwidth of the ultra narrow-band single carrier waveform is narrow enough such that no repetition coding is needed for the communication controller to provide enhanced coverage to the MTD.

20. The method of claim 15, wherein the communications requirements comprises at least one of a coverage requirement, a communications system load, MTD geometry, MTD power consumption, a frequency of transmissions made by the MTD, a bandwidth requirement of the MTD, an amount of data to be transmitted by the MTD, a priority level of the MTD, and a priority level of transmissions made by the MTD.

21. A communications controller comprising:
a processor configured to determine communications requirements for a machine-type device (MTD), and to assign a first signal waveform out of a plurality of signal waveforms to the MTD in accordance with the communications requirements for the MTD, wherein each signal waveform has an associated characteristic signal bandwidth, and wherein the MTD is configured to perform machine-to-machine (M2M) communications; and
a transmitter operatively coupled to the processor, the transmitter configured to transmit information about the first signal waveform to the MTD.

22. The communications controller of claim 21, further comprising a receiver operatively coupled to the processor, the receiver configured to receive a packet from the MTD, wherein the packet is transmitted using the first signal waveform.

23. The communications controller of claim 21, wherein the information about the first signal waveform comprises transmission characteristics of a communications channel used to convey the first signal waveform, the transmission characteristics include at least one of a bandwidth associated with the MTD, and a level of a modulation and coding scheme (MCS) used for transmission.

24. The communications controller of claim 23, wherein the processor is configured to alter the transmission characteristics of the communications channel in accordance with at least one of a channel condition of the communications channel, and a system load of the communications controller, and to assign a second signal waveform selected from the plurality of signal waveforms to the MTD in accordance with the altered transmission characteristics, and wherein the transmitter is configured to transmit information about the second signal waveform to the MTD.

25. The communications controller of claim 24, wherein the processor is configured to increase the level of the MCS in response to determining that the system load of the communications controller is overloaded, and to increase the bandwidth allocated to the MTD in response to determining that the system load of the communications controller is underloaded.

26. The communications controller of claim 21, wherein the communications requirements comprise at least one of a coverage requirement, a communications system load, MTD geometry, MTD power consumption, a frequency of transmissions made by the MTD, a bandwidth requirement of the MTD, an amount of data to be transmitted by the MTD, a priority level of the MTD, and a priority level of transmissions made by the MTD.

27. A machine-type device (MTD) comprising:
a transmitter configured to transmit communications requirements of the MTD to a communications controller, the MTD configured to perform machine-to-machine (M2M) communications and the communications requirements being used to assign a signal waveform to the MTD, wherein the signal waveform has an associated characteristic signal bandwidth;
a receiver configured to receive transmission characteristics of the signal waveform from the communications controller, wherein the transmission characteristics include at least one of a bandwidth associated with the MTD, and a level of a modulation and coding scheme (MCS) used for transmission; and
a processor operatively coupled to the receiver and to the transmitter, the processor configured to generate a packet including data to be transmitted, wherein the transmitter is further configured to transmit the packet to the communications controller in accordance with the transmission characteristics, wherein the packet is transmitted using the signal waveform.

28. The MTD of claim 27, wherein the transmitter is configured to modulate the packet with offset quadrature amplitude modulation.

29. The MTD of claim 28, wherein the transmitter is configured to filter the modulated packet with a frequency localized pulse shaping filter.

30. The MTD of claim 27, wherein the transmitter is configured to transmit the packet with an ultra narrow-band single carrier waveform, and wherein the associated characteristic signal bandwidth of the ultra narrow-band single carrier waveform is narrow enough such that no repetition coding is needed for the communication controller to provide enhanced coverage to the MTD.

31. The MTD of claim 27, wherein the communications requirements of the MTD comprise at least one of a coverage requirement, a communications system load, MTD geometry, MTD power consumption, a frequency of transmissions made by the MTD, a bandwidth requirement of the MTD, an amount of data to be transmitted by the MTD, a priority level of the MTD, and a priority level of transmissions made by the MTD.

* * * * *